(12) United States Patent  
Kalson et al.

(10) Patent No.: US 9,050,524 B2  
(45) Date of Patent: Jun. 9, 2015

(54) METHOD FOR USING IMAGES TO GENERATE GAMEPLAY CONTENT

(71) Applicant: Disney Enterprises, Inc., Burbank, CA (US)

(72) Inventors: Amy B. Kalson, Burbank, CA (US); Chang Hoh Koo, Glendale, CA (US); Dana J. Dispenza, Valencia, CA (US); Derek T. Dutilly, Valencia, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 13/862,906

(22) Filed: Apr. 15, 2013

(65) Prior Publication Data

US 2013/0237320 A1    Sep. 12, 2013

Related U.S. Application Data

(62) Division of application No. 12/570,171, filed on Sep. 30, 2009, now Pat. No. 8,419,534.

(51) Int. Cl.

| A63F 13/10 | (2006.01) |
|---|---|
| G07F 17/32 | (2006.01) |
| A63F 13/00 | (2014.01) |
| A63F 13/40 | (2014.01) |

(52) U.S. Cl.  
CPC ................ *A63F 13/00* (2013.01); *A63F 13/10* (2013.01); *A63F 2300/6018* (2013.01); *A63F 2300/65* (2013.01); *A63F 2300/6623* (2013.01); *A63F 2300/695* (2013.01)

(58) Field of Classification Search  
CPC ...  A63F 13/10; A63F 2300/406; G07F 17/32; G07F 17/3211  
USPC .......................................... 463/30, 31, 42, 43  
See application file for complete search history.

(56) References Cited

U.S. PATENT DOCUMENTS

| 4,710,873 A | 12/1987 | Breslow et al. |
|---|---|---|
| 5,317,689 A | 5/1994 | Nack et al. |
| 5,748,867 A * | 5/1998 | Cosman et al. ................ 715/811 |
| 6,149,519 A | 11/2000 | Osaki et al. |
| 6,342,892 B1 | 1/2002 | Van Hook et al. |
| 6,697,074 B2 * | 2/2004 | Parikh et al. ................... 345/522 |
| 7,036,079 B2 | 4/2006 | McGlinchey et al. |
| 2004/0143852 A1 | 7/2004 | Meyers |
| 2004/0152512 A1 | 8/2004 | Collodi et al. |
| 2007/0066393 A1 | 3/2007 | Paul et al. |
| 2008/0266299 A1 | 10/2008 | Cohen et al. |
| 2009/0181736 A1 | 7/2009 | Haigh-Hutchinson |
| 2010/0197399 A1 * | 8/2010 | Geiss .............................. 463/32 |

OTHER PUBLICATIONS

"Audiosurf: Ride Your Music", http://www.audio-surf.com (at least as early as Jul. 13, 2009), 1 page.

(Continued)

*Primary Examiner* — Pierre E Elisca  
(74) *Attorney, Agent, or Firm* — Dorsey & Whitney LLP

(57) ABSTRACT

Systems and methods for using images to generate gameplay content are disclosed herein. Specifically, for example, one aspect of the present disclosure involves a method for altering a virtual world generated by a video game system. The method includes obtaining one or more images from sources external to the video game system and processing the one or more images to obtain one or more inputs. The one or more inputs are provided to a gameplay engine to alter an output of the gameplay engine.

20 Claims, 12 Drawing Sheets

(56) References Cited

OTHER PUBLICATIONS

"Web Page Wiki Describing the Multiverse, Inc. Terrain Generation System", Multiverse, Inc., downloaded by USPTO on Sep. 17, 2012 from http://web.archive.org/web/20080802214416/http://update.multiverse.net/wiki/index.php with an archive.org verified date of Aug. 2, 2008, 8 pages.

* cited by examiner

METHOD FOR USING IMAGES TO GENERATE GAMEPLAY CONTENT

CROSS-REFERENCE TO RELATED APPLICATION

This application is a divisional of U.S. patent application Ser. No. 12/570,171 entitled "Systems and Methods for Using Images to Generate Gameplay Content" filed on Sep. 30, 2009, now U.S. Pat. No. 8,419,534, which is hereby incorporated in its entirety by reference as though fully disclosed herein.

FIELD OF THE INVENTION

Aspects of the present invention relate generally to video game systems and, more particularly, systems and methods for using images to generate gameplay content for video game systems.

BACKGROUND

Modern video game designs are becoming increasingly complex, offering a larger amount and variety of gameplay content to the player. Correspondingly, video game players' expectations have risen such that they expect both a greater amount of game content as well as a greater variety of content.

Video game developers expend a large amount of time and effort trying to meet the expectations of video game players and to provide them with a state of the art gaming experience. To short circuit some of the work and reduce the time involved in the creation of video games, some games implement Procedurally Generated Content (PGC) as a method to generate some aspects of game content. PGC refers to the generation of content in real time or on the fly, rather than prior to distribution. Generally, PGC has applied to the creation of art related content, such as meshes, textures and trees.

Typically, procedurally generated systems require an input or seed, which is then used in algorithms to generate the content. This input or seed has been obtained from an array of numbers, a set of random numbers created by a random number generation algorithm on the game system's processor, and a bar-code which generated statistics for a fighting game, for example. More recently, audio files have been used as input to generate music-based gameplay.

SUMMARY

One aspect of the present disclosure involves a method for altering a virtual world generated by a video game system. The method includes obtaining one or more images from sources external to the video game system and processing the one or more images to obtain one or more inputs. The one or more inputs are provided to a gameplay engine to alter an output of the gameplay engine.

Another aspect of the present invention includes a method of generating unique gameplay content for a video game virtual world. The method includes obtaining a digital image from a network location, an image capture device, or a memory device coupled to a game system upon initiation of a video game. Data is extracted from the digital image and one or more characteristics of the image are determined based on the extracted data. The method also includes providing the one or more characteristics of the image to a gameplay engine and generating interactive gameplay content based on the one or more characteristics of the image.

Another aspect of the present disclosure includes a video game system for operating a video game. The video game system includes at least one processor and a memory coupled to the processor. The memory is configured to store digital images obtained by the video game system. The video game system also includes a video game content source in communication with the processor. The video game content source includes a video game application and the processor is configured to execute the video game application to generate gameplay content based on data extracted from the digital images. The video game system also includes an output device coupled to the processor and configured to present the gameplay content to a player.

DETAILED DESCRIPTION

Aspects of the present disclosure involve a system that receives and processes images to generate video gameplay content. One particular aspect of the present disclosure involves a system that obtains a digital image, processes the image to obtain data that is used to affect the content of a video game running on the system. For example, the system may process one or more images to obtain one or more inputs and providing the one or more inputs to a gameplay engine. In turn, any or a variety of outputs of the gameplay engine may be altered. If, for example, the gameplay engine provides any of a variety of virtual world features (e.g., trees, buildings, race course layout, attacking characters, etc.) their features may be altered in response to the receipt of the image (e.g., number and arrangement of trees and buildings changed, race course layout changed, number and pattern of attackers changed, etc.).

It should be understood that the terms "video gaming system," "gaming system," and/or "computer system" as used herein refer to any processor based system that may be configured to operate software or programs to output video game content. As such, the use of such terms is intended to be used broadly to include personal computers, dedicated video game consoles, hand held computing and communication devices, and notebook computers, for example. Additionally, the term "gameplay engine" as used herein may refer to software and programs that are executed by a processor to generate content for a video game. In some embodiments, the gameplay engine may include a dedicated processor, an application specific integrated circuit, and/or any other suitable software and hardware combination to generate gameplay content. Furthermore, the terms "gameplay content," and "content," generally refer to a virtual world created for use and for output by a video game. The content may include colors, context, sounds, conditions, different levels, etc. Additionally, users may interact with the gameplay content and influence the course of the content generated by a video game system. More particularly, as described herein, an image input into the system may alter the content presented to a user.

Figure 1:
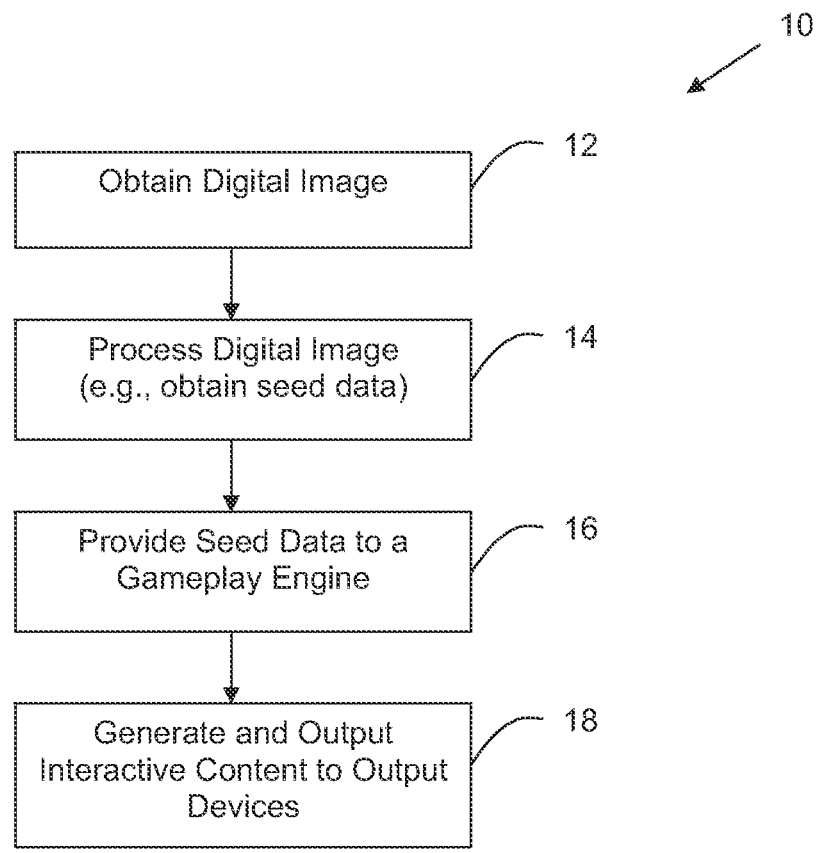
FIG. 1 is a flowchart illustrating the method for using photographic images for generating procedurally generated gameplay content.

Turning to the figures and referring initially to FIG. 1, a flowchart of an example method 10 for altering gameplay content for a video game system is illustrated. The method 10 includes obtaining a digital image, as indicated at block 12. Images can be obtained from a variety of image sources. For example, video game systems can read media (including hard-disks, floppy discs, compact discs, digital video discs, Blu-ray™ discs, portable media/SD Cards™, etc.) to obtain the data. In some embodiments, images may be stored on media integral to the system. For example, one or more images may be saved on a hard drive of a system and may be retrieved. If there is more than one image on the hard drive, an image may be selected in a sequential manner or randomly.

Additionally, images can be retrieved from a network (e.g., Internet) location. In particular, a user can input a uniform resource locator ("URL") into a system where an image may be found. The URL may link the system to a particular image or to a site with a plurality of images. If more than one image is located at the URL, the system may randomly select an image, the user may select an image, or other means of selecting an image may be employed. Alternatively, the system may be programmed to retrieve images from a specific website. The image(s) accessible at the URL may be uploaded to the URL by users or may be placed at the URL by the owner/website operator. In some embodiments, the URL may include continuously changing images, while in other embodiments, the URL may include one or more images that do not change. Additionally, in one embodiment, the system may be configured to automatically retrieve an image from a URL without user input.

Cameras coupled to the system or installed as part of the system can also capture video or still images as input. Continually more video gaming systems and computers are being equipped with integrated cameras. Additionally, if not equipped with a camera, a camera may be coupled to a video gaming system or computer through a communication port, such as a USB port, for example. When a camera coupled to or integral to the system captures an image, the image may be stored in a specified memory location so that the image may be located and processed to extract data from the image useful in affecting the gameplay content.

Once the system receives an image, the image is processed, as indicated at block 14, to be used in the generation of graphics and/or gameplay content. The image can be processed as a whole or, in some embodiments, only selected portions of the image are processed. In one example, the system processes only selected pixels of an image. For example, the system may select one or more pixels at random from the image and the color of the pixels and/or other features of the pixels may be used as seed values for generating gameplay content for the video game system. The "seed values," as used in this context may refer to one or more bits provided to an algorithm, such as a pseudo random number generator algorithm or a gameplay content generation algorithm, for example.

In another example, the system may analyze characteristics of the image to generate the content. Characteristics examples may include determining a location depicted in the image. For example, it may be determined if an image includes a rural landscape image, a city skyscape, a bar, etc. Furthermore, famous locations may be recognized by the system and used to generate content related to such locations. If the system receives an image of the Eiffel Tower, for example, video game content may be generated related to Paris or France. Thus, the image may be processed in a number of different ways to obtain data that may be used in generating video game content.

After initial processing of the image to extract data, identify characteristics of the image, or otherwise, the extracted image data is provided to a gameplay engine for the creation of content based on the data obtained from the image, as indicated at block 16. The gameplay engine may be configured to process the image in a variety of different ways and the particular processing will depend on the specific programming of a particular video game system or software operating on the system. Specifically, different systems may be configured to process an image to extract data in one way while another system may extract data in a different way. Additionally, data extracted from a common image may vary between the different systems and the extracted data may be used for various different purposes depending on the type of video games operating on a particular system. Moreover, data extracted from an image may be used in various different ways to achieve a particular end based on the software (e.g., video game) running on the system. For example, a video game based on vehicles racing may use data extracted from an image to set a race course, while a war-based game may use data to determine the size, number and relative power of an enemy's force. Furthermore, it should be appreciated that in some embodiments a system may extract variant data from a single image in iterative processing operations. That is, for example, the system may extract a first set of data the first time the image is processed and a second different set of data the second time the image is processed.

Accordingly, there are many and varied ways and purposes that a particular system may process images. In one example, an image may be examined to determine if there are a threshold number of curved lines, straight lines, or other characteristics the gameplay engine may use to generate content. For example, the gameplay engine may include a code sequence that generates a body of water by determining the arrangement of lines in the image, e.g., straight lines versus curved lines. A gameplay engine may generate content based on the curve assessment by generating a body of water with gentle waves (if straight lines) or rough waves (if curves), for example. As such, the gameplay engine generates graphical content based on some characteristic of the image.

There may be several different ways to determine the linearity or curvature of lines in an image. An example may include examining the color patterns within an image and feeding pixels within a certain color range through a mathematical model to extract a mathematical formula that recreates the pixel distribution. The mathematical formula can then be determined to be a line function or a curve function. Generally, to detect straight line versus curved line, first there needs to be a set of rules to define what "straight" and what "curved" means and where the threshold is between the two. There are several examples that may be found in the art for the determination between straight and curved lines in images.

In another example, a facial recognition system could be used to identify key visual characteristics of a person's face and generate a character based on those characteristics. Another example uses an edge finding algorithm to find edges in an image. The edges may be processed by the gameplay engine to generate attack schemes or maps for the gameplay content. Another example includes identifying the amount of noise within an image. Generally, the amount of noise may then be used to alter the content of the game such as the aggressiveness of the characters in the game or the number or type of obstacles to achieve a particular goal, for example. Yet another example includes identifying general colors and utilizing averaging routines to gather input data that can be used to create moods, color schemes, and/or other video game content.

It should be understood that although several examples have been given of both the processing of the image and the generation of content based on the image, there may be many other ways to process images to generate gameplay content. Although not expressly discussed herein, it is intended that such processing is believed to fall within the scope of the present disclosure and as such, the examples set forth herein are not intended to limit the scope of the disclosure, but rather are provided as specific examples of the general idea of using images to alter gameplay content in a video gaming context.

After the system processes the image to extract data provided to the gameplay engine, content is generated and output to a user, as indicated at block 18. The output may take a variety of forms; the foregoing examples included graphics, game flow, difficulty, sound, etc. Other implementations could include placement of enemies in a fighting game or level geometry for a racing game. Still other implementations could have affects on characters within the game world, affecting how characters react, their mood, or even dialogue and audio provided to the player. Yet other implementations may affect player goals or objectives, making the game easier or harder based upon the input data extracted from the image. This data is output into a format useful to the game engine and displayed in its in-game format to the player. That is, if the game is a role play game or virtual reality, the content provided to the user would fit into the construct of the particular role play game, for example. The following discussion presents several specific examples in greater detail to further illustrate particular embodiments.

Figure 2:
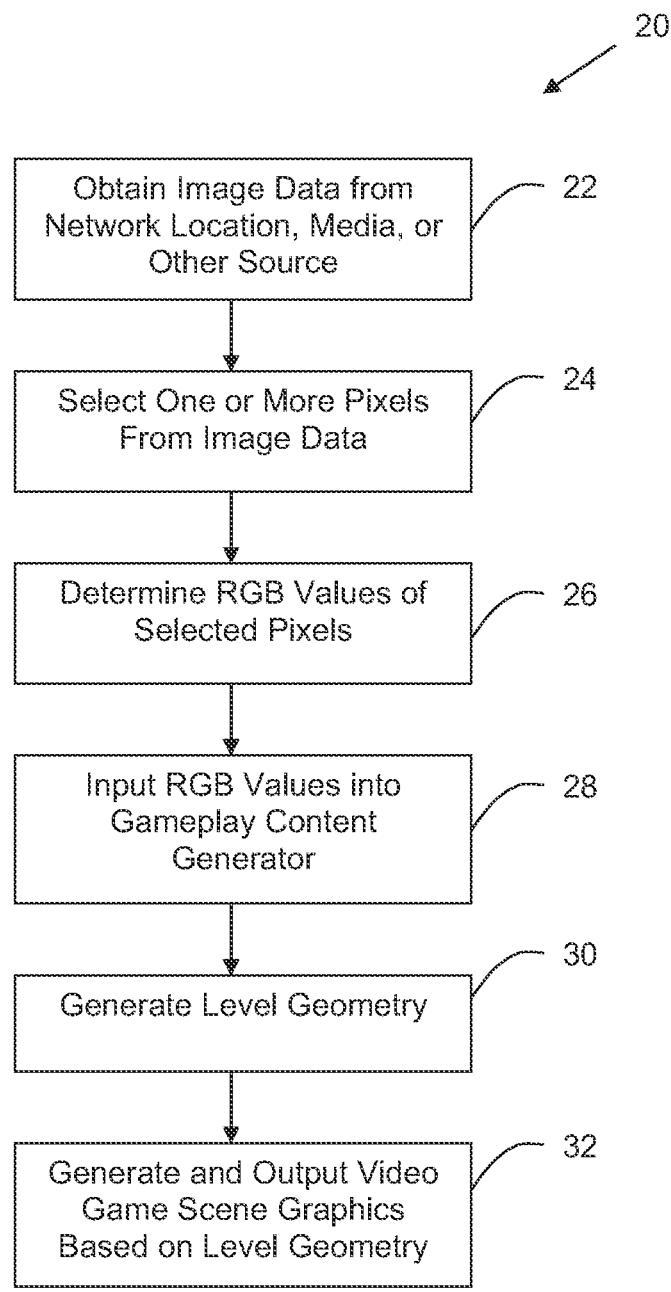
FIG. 2 is a flowchart of an example method for generating a level geometry from an image stored on a computer readable medium.

Turning now to FIG. 2, a flowchart of an example method 20 for generating a level geometry from an image stored on a computer readable medium is illustrated. The method 20 includes reading an image from a computer readable medium, as indicated at block 22. The computer readable media may be removable or may be integral to the video game system and may include, for example, hard-disks, floppy discs, compact discs, digital video discs, Blu-ray™ discs, portable media/SD Cards™, etc. In some embodiments, the user may select a particular image to be used in generating the content. In other embodiments, the system may randomly select an image stored on the media.

Figure 3A:
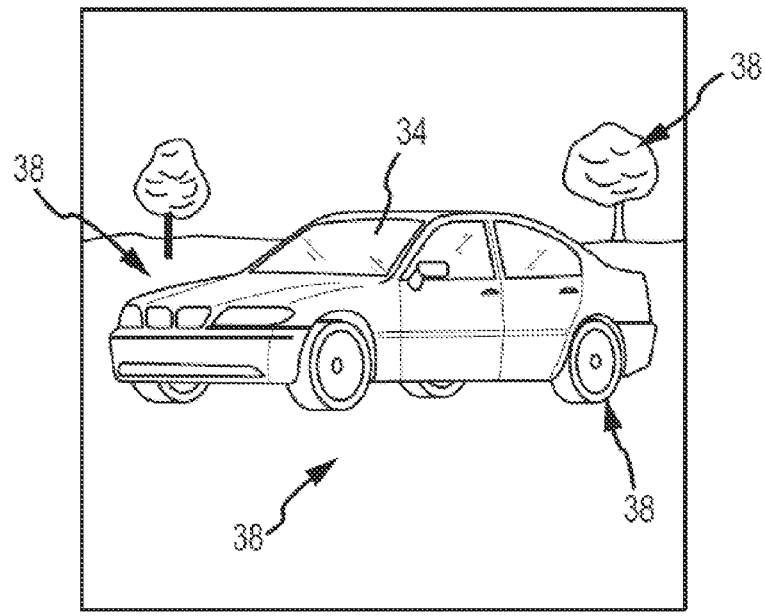
FIG. 3A illustrates an example image of a car that may be used to generate gameplay content.
Figure 4A:
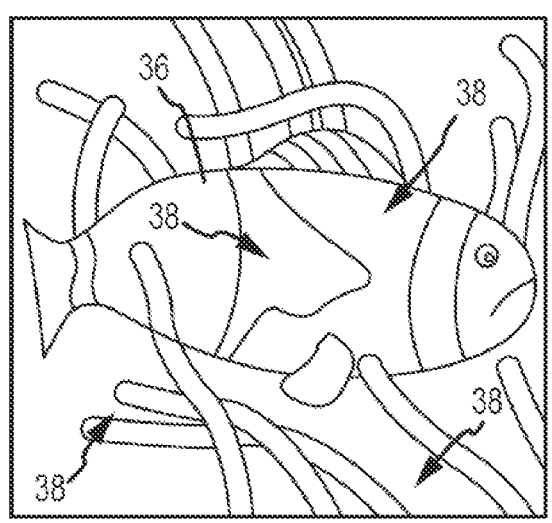
FIG. 4A illustrates an example image of a fish that may be used to generate gameplay content.

Once an image has been obtained, the system selects pixels from the image for use in altering the gameplay content, as indicated at block 24. FIGS. 3A and 4A illustrate two example images that have been selected for altering the gameplay content. FIG. 3A is an image of a car 34 and FIG. 4A is an image of a fish 36. Pixels 38 in each image may be randomly selected from each image. The random pixels are indicated by arrows. Red, Green and Blue (RGB) values of the selected pixels are read into memory, as indicated at block 26. For example, referring again to FIG. 3A, the four pixels 38 sampled by the program have the RGB values of: [(193, 204, 199), (187, 78, 51), (17, 18, 18), and (92, 89, 86)]. Referring to FIG. 4A, the four pixels 38 sampled by the program have the RGB values of: [(165, 63, 17), (225, 89, 24), (103, 72, 59), (244, 238, 226)].

The RGB values are then used as a seed or input for a content generating algorithm, as indicated at block 28. In this example, the RGB values are used for generation of terrain for a video game. As such, the RGB values may be provided to a terrain generator type gameplay engine. As such, the RGB values of the pixels 38 of FIG. 3A are inserted into an array [193, 204, 199, 87, 78, 51, 17, 18, 18, 92, 89, 86] and passed to a procedural terrain generator. Similarly, the RGB values of the pixels 38 of FIG. 4A are inserted into an array [165, 63, 17, 225, 89, 24, 103, 72, 59, 244, 238, 226] and passed to the procedural terrain generator. The terrain generator may be software and/or hardware that generates a topography upon which other video game content may be built and with which a user interacts.

Terrain generators are well known in the game industry. Typically, terrain generators are fed a random number from a random number generator. Hence, generally, terrain generators take an input of variables (seeds) and process them and output them. Here, however, the random number generator may be replaced with the seed input from the image. This involves modifying a terrain generator to use the values as input, rather than using the input from a random number generator. In one embodiment, the values extracted from the image may be formatted in the same manner as values received from a random number generator so that the terrain generator operates as if the values extracted from the image are from a random number generator.

Figure 3B:
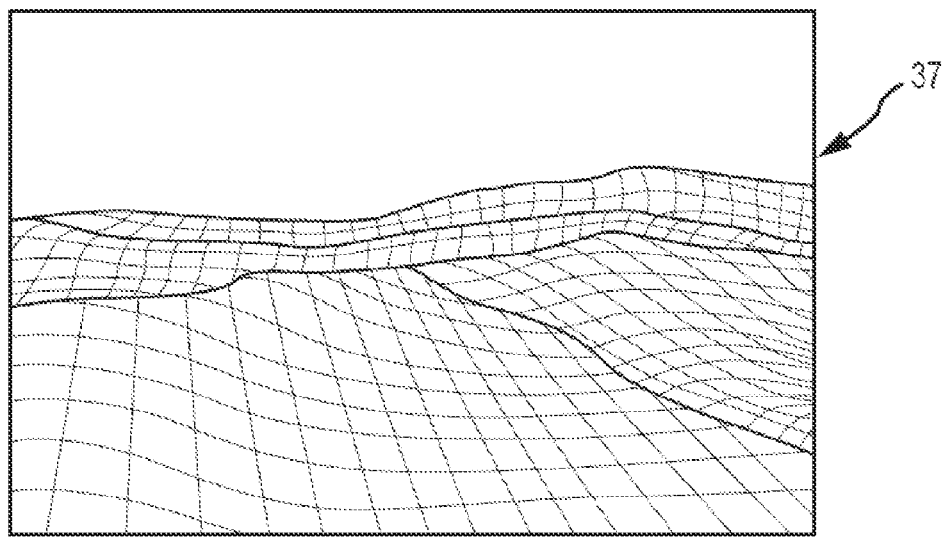
FIG. 3B illustrates an example of a terrain generated from data of the example image of the car in FIG. 3A.
Figure 4B:
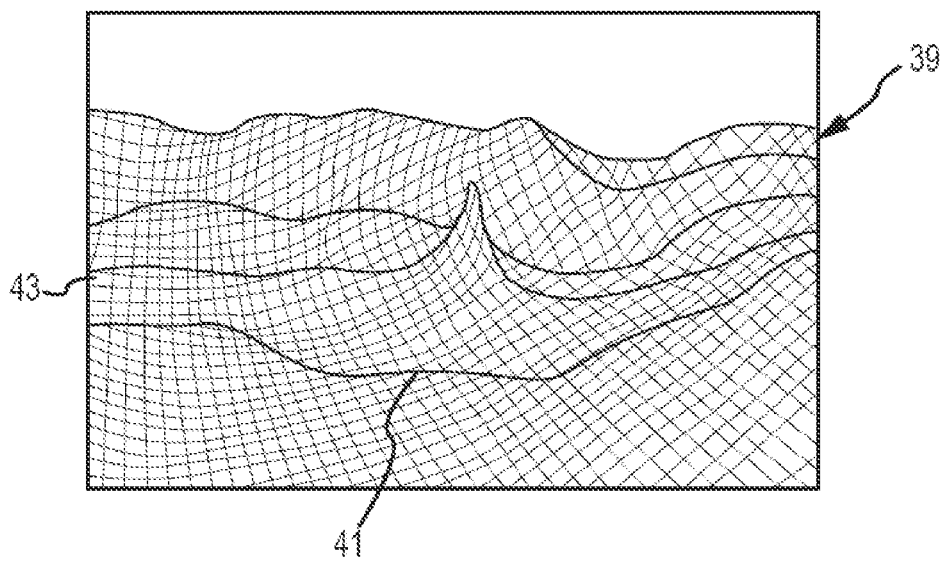
FIG. 4B illustrates another example terrain generated from data of the example image of the fish in FIG. 4A.

The terrain generator then generates level geometry and outputs graphics based on the created level geometry with which a user may interact, as indicated at block 30 and 32. For the pixels 38 selected from FIG. 3A, the generator creates a hilly terrain model 37 shown in FIG. 3B, which is used to generate the final terrain to be output to a user. There are multiple methods by which terrain can be generated from different number sequences, including Genetic Terrain Programming, the Diamond Square Algorithm and midpoint displacement. In the present example, the terrain generator algorithm may be modified to utilize the input created by the image processing. Comparatively, the generator creates a terrain model 39 with more valleys, water 41 at the bottom and a large spike 43 in the middle, as illustrated in FIG. 4B, based on the selected pixels 38 of FIG. 4A. Because each input provides different starting values for terrain generation (based upon the individual seed extracted from the images), each would provide a different output. The exact terrain generated will depend not only on the seed values extracted from the images but also on the specific algorithm used for the terrain generator. Additionally, because only a relatively few pixels are sampled for use in generating content, the same image may be used and result in the output of different terrain. Additionally, by allowing for the selection of different images, different terrain can be generated, specific to the selected image(s).

Figure 5:
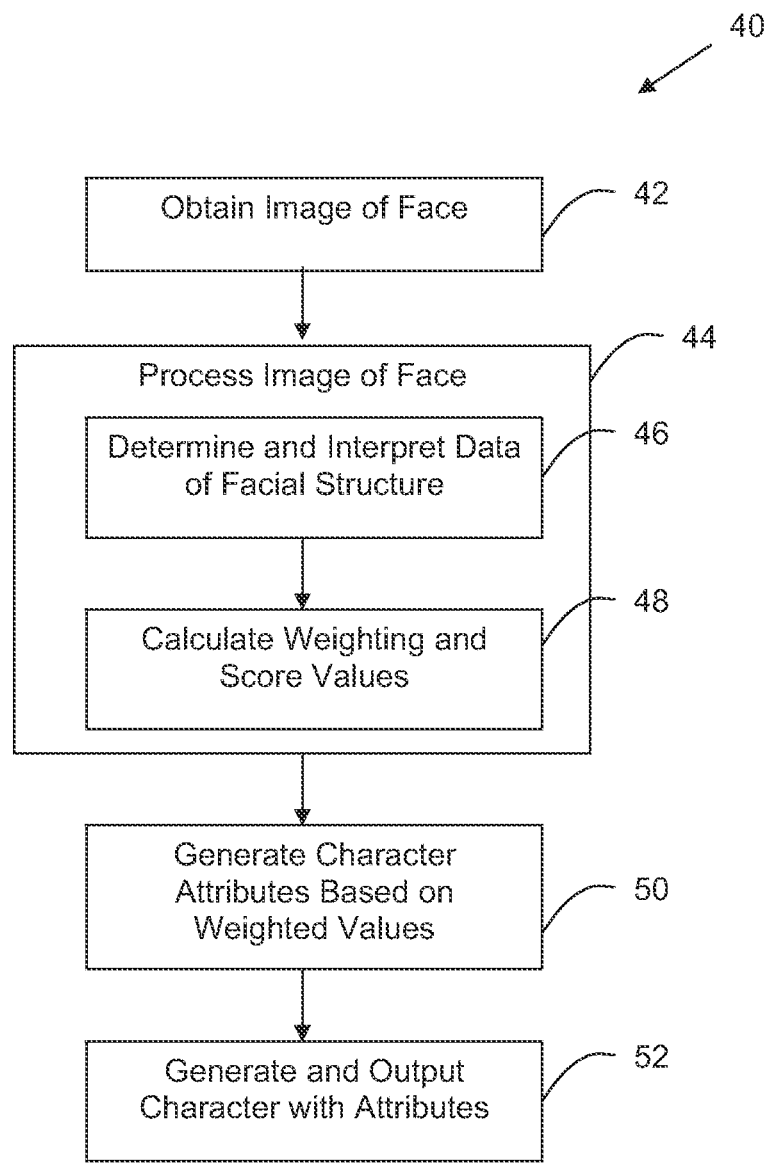
FIG. 5 is a flowchart illustrating a method of using a facial image to generate gameplay content.
Figure 6A:
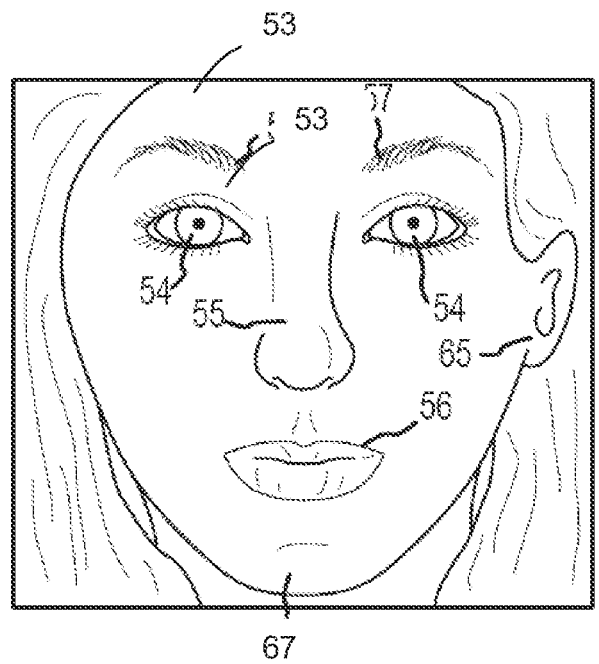
FIG. 6A illustrates an image of a face that may be used to generate gameplay content.

FIG. 5 is a flowchart illustrating a method 40 for using an image of a face to alter gameplay content. The method 40 begins with obtaining an image of a face, as indicated at block 42. A camera may be coupled to the video game system or integrated into the video game system and used to obtain a digital image of a user's face. FIG. 6A illustrates an example of a image of a face 53 for the purposes of this embodiment.

The image of the face 53 is processed, as indicated at block 44, to extract data to be input into the gameplay engine. The processing of the image of the face 53 may include determining and interpreting data related to the facial structure, as indicated at block 46. More particularly, any face will likely include two eyes 54, a nose 55, mouth 56, eyebrows 57, chin 67, etc. that may be used for extracting data from the face 53.

Figure 6B:
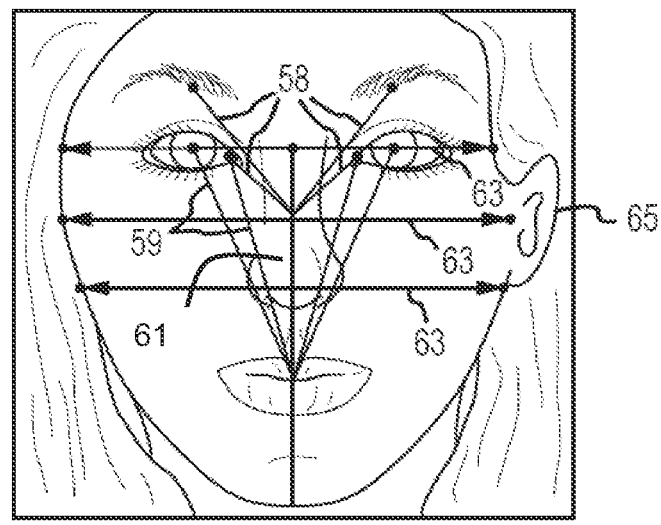
FIG. 6B illustrates the face of FIG. 6A with lines indicating measurements that may be used to extract metrics from the face of FIG. 6A.

FIG. 6B shows lines connecting features of the face 53 of FIG. 6A that may be used to determine data related to the structure of the face. The lines may be generated by software that is configured to recognize facial features, such as eyes, nose, mouth, etc. and connect particular points of the face with a line, as illustrated. Facial recognitions technology is available from Microsoft™, Nintendo™, and Sony™, and related algorithms may be known in the art that may be used in determining facial features and further processing of the facial image. The lines may connect or be drawn between features of the face 53 such as the eyes 54, nose 55, mouth 56, etc. and creating the lines to connect the features. As illustrated, lines 58 may be drawn from the eyes 54 and eyebrows 57 to the nose 55. Other lines 59 may be drawn from the eyes 54 and tear ducts to the mouth 56, with yet another line 61 from a top of the nose 55 (in between the eyes 54) to the chin 67. Additionally, a parallel lines 63 may be drawn through the eyes 54 to the edges of the face 53, to connect the ears 65, and at the bottom of the nose 55.

Generally, the lines may aid in identifying any number of possible characteristics of the face 53, which could include: facial symmetry, eye shape, slope of eyes, ratio between nose width to height, cheek prominence, angle of chin, etc. These characteristics are given merely as examples and other characteristics and other methods may be implemented in an actual embodiment. The facial symmetry may be determined by comparing the length and slope of the lines on the right side of the face to those on the left side of the face. The eye shape may be determined by calculating the ratio of the eye height to width. The slope of the eyes may be determined based on calculating the angle of the lines from the center of the tear ducts to the mouth and the center of the eye to the mouth. Cheek prominence may be determined by identifying the distance between the line drawn between the eyes and the line drawn connecting the ears. The angle of the chin may be determined by calculating the angle of the line drawn from the tip of the chin to the base of the ears. It should be understood that these are given merely as example measurements and other measurements not specifically mentioned may be utilized in an actual implementation.

In one embodiment, the various data of the face 53 may be weighted against average values for such characteristics and scored to modify a particular characteristic of a character in a video game, as indicated at block 48. In some embodiments, for example, threshold values may be used to determine a relative value of an identified characteristic against an average value for that characteristic. If a particular set of data exceeds the threshold, an associated characteristic in a video game character may be increased or decreased accordingly. In other embodiments, a raw value indicative of a length of a line or a ratio of a length of one line to another may be used to modify the gameplay content.

In a more specific example, the data from three different facial features such as the angle of the eyes, nose to chin/width of head ratio, and distance of eyes to eyebrow, may be used by the gameplay content generator to generate attributes of a character in a video game, as indicated at block 50. Specifically, these three different facial features may be applied to the video game character's strength, defense and speed, respectively, for example. In one embodiment, a standard video game character may be provided to which the strength, defense and speed are applied. The standard video game character may be a default character that is programmed to be used in the event that no facial image is provided. The default character may be programmed with average strength, defense and speed (e.g., five out of ten for each characteristic). The default character's traits are then modified upward or downward based on the angle of the eyes, nose to chin/width of head ratio, and distance of eyes to eyebrow in the facial image provided.

Once data has been extracted from the face 53 and processed in a meaningful way to be used in the video game content (e.g., compared with a threshold and/or associated with a particular attribute), the system generates and outputs the created character, as indicated at block 52. Thus, in some embodiments, the resultant characteristics are expressed in the gameplay content when they are attached to an in-game character which utilizes those characteristics to provide variation in gameplay content based on variations in the face 53 relative to other images of faces that may be used. It is easy to see that different faces will have different characteristics and, hence, different faces will yield different resulting gameplay characteristics.

Figure 7:
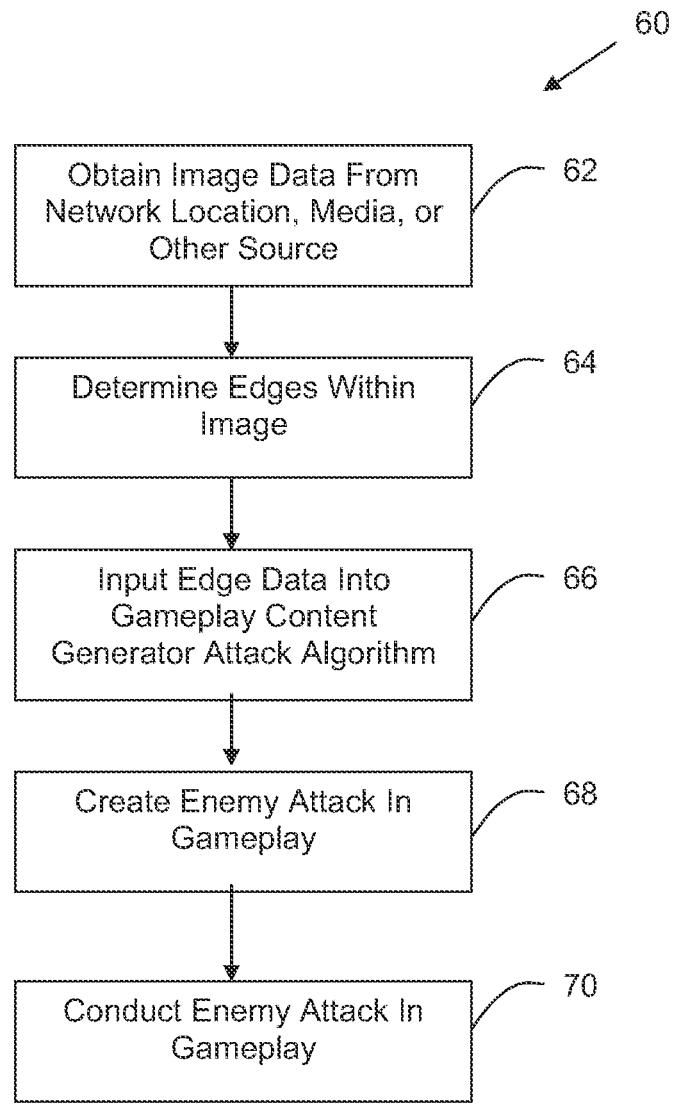
FIG. 7 is a flowchart illustrating a method of using edges of an image to generate content for gameplay.
Figure 8A:
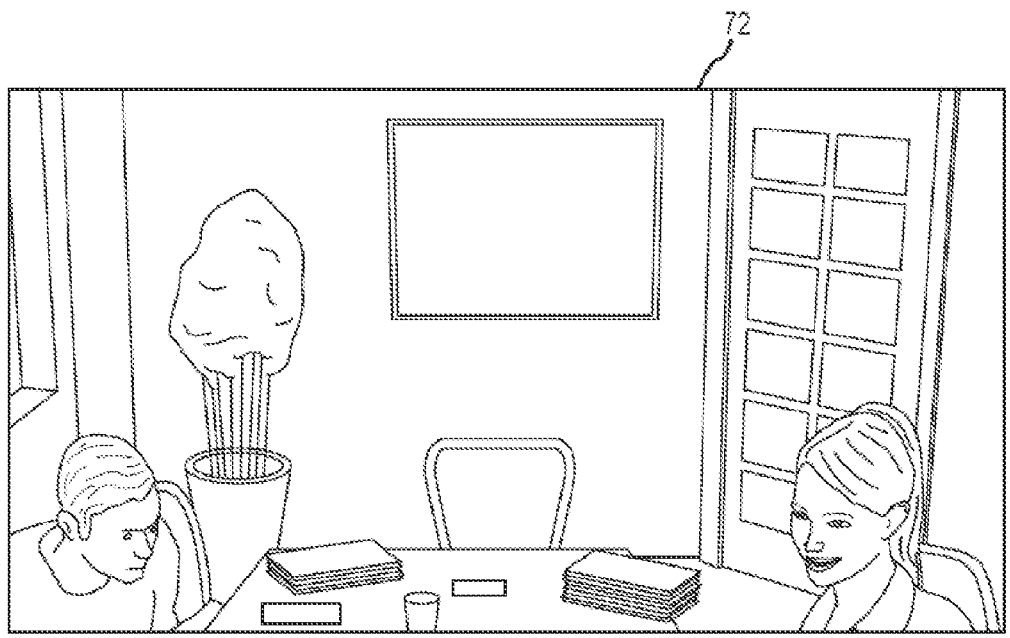
FIG. 8A is an example image that may be used to generate content for gameplay.

FIG. 7 is a flowchart illustrating a method 60 for using edges of objects in an image to affect gameplay content. The example set forth in FIG. 7 relates to generating enemy attack patterns from an image stored at a universal remote locator (URL) address, but the image may be obtained in any suitable manner. As indicated at block 62, an image may be obtained via media as well as over a network connection. In one embodiment, the image found at the URL is selected from an array or listing of images by a user and read into the video game system. In another embodiment, the system may automatically read in an image located at a given URL. FIG. 8A illustrates an example image 72 that may be obtained over the Internet.

An edge finding algorithm is applied to the image 72, as indicated at block 64. Edge finding algorithms are common and known in the art. Additionally, there are commercially available photo editing software packages, such as Photoshop™, Acrobat™, etc., that perform edge detection in images. Generally, edges in an image are determined by comparing values, such as RGB values, of adjacent pixels to determine if there is a threshold level of difference between the pixels such that an edge can be determined. Edges may be relatively easy to find if there are strongly contrasting colors, textures and/or depth of field in the image.

In some embodiments, the threshold level for determination of an edge may be adjusted within the algorithm to alter the edge sensitivity to a desired level. Moreover, the threshold level may be set based on the particular type of game for which the image is being used to generate content or based or on the available processing power and allowable time delay for processing, among other things. For example, in a war game where the edges are to be used to forming attack patterns, the threshold levels may be moderately set so that the edges may be used for generally forming infantry lines. In a video game for children, however, where the edges are to be used for a background setting, the threshold may be set higher to reduce the overall number of edges found and, hence, reduce the number of features included in the background, thereby simplifying the background.

Referring again to the example of the attack pattern, the determined edges of the image are input into an attack algorithm, as indicated at block 66. The attack algorithm may be a software routine that generates attack patterns and/or determines the aggressiveness and numbers of attackers. Thus, an enemy attack pattern is generated, as indicated at block 68, based on the edges of the image. The resulting image is generated and the attack is conducted in gameplay, as indicated at block 70. The enemy then attacks based upon the attack plan.

Figure 8B:
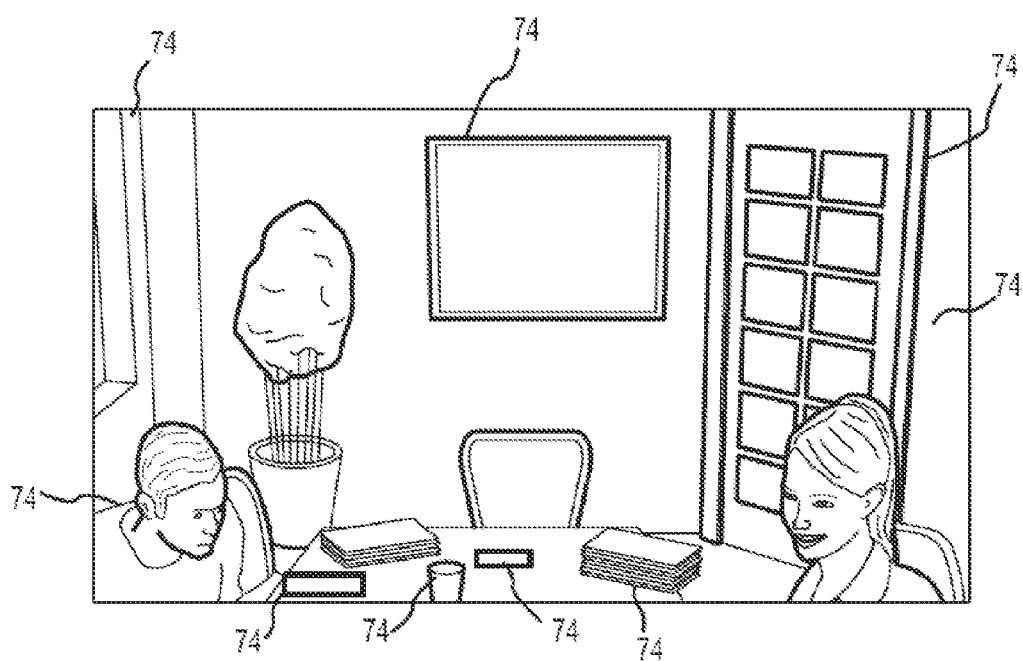
FIG. 8B illustrates results of running an edge detection algorithm on the image of FIG. 8A to determine edges within the image.
Figure 8C:
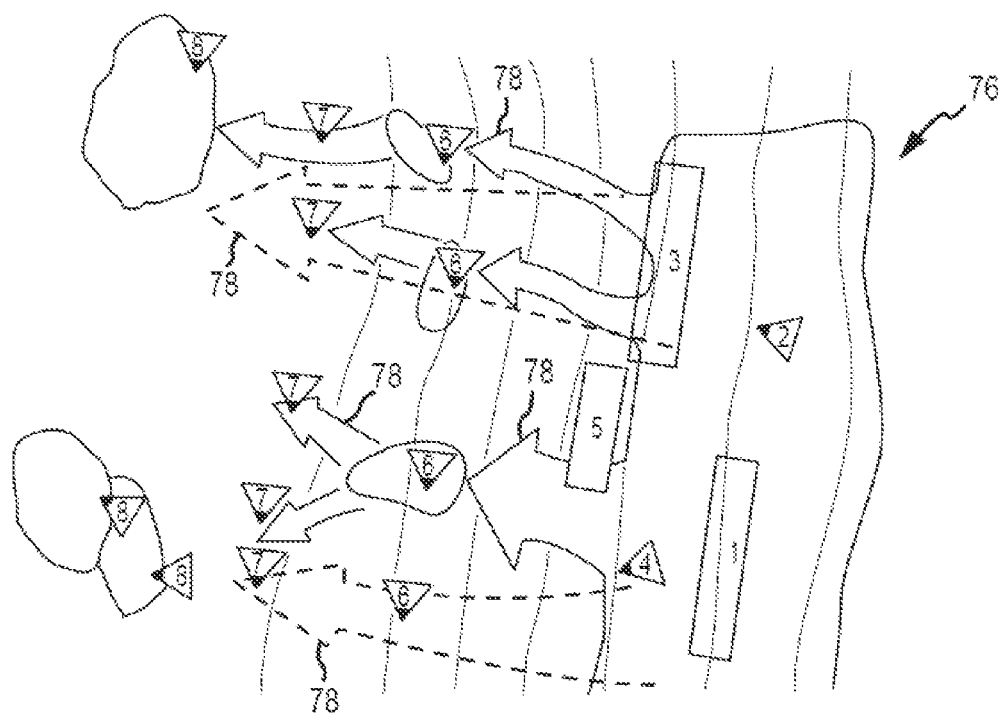
FIG. 8C illustrates a possible use of the edge information from the image to create an attack pattern for video game content.

FIG. 8B illustrates the image of FIG. 8A following an edge detection algorithm. As can be seen, the edges 74 of the contents of the image form a variety of geometric shapes that correspond to shapes found in the original image shown in FIG. 8A. FIG. 8C illustrates a potential attack pattern 76 generated based on the edges 74 of FIG. 8B. As can be seen, the attack pattern 76 roughly approximates the geometric shapes created by the edges 74 shown in FIG. 8B. The attack plan 76 includes arrows 78 to indicate the movement of the attack plan 76 from the right-hand side of FIG. 8C to the left-hand side.

Attack flow, the generation of attack patterns, and number of troops are controlled by game logic subsystem in video games. These, much like the terrain generators, utilize variables (seeds) in combination with a look-up table to provide output such as attack patterns and number of troops involved. The specific example system illustrated herein may be created to weigh the average of the pixels identified and group them into clusters that identify the weighting that goes into the attack patterns of each grouping. Since there are a threshold number of edge pixels across the top and bottoms of the images it splits the group into two forces. Then, as the pixels on the left spread out into separate groupings the attack pattern follows suit. The number of troops to utilize within each attack pattern is determined by the weighting of the number of edges detected.

Figure 9:
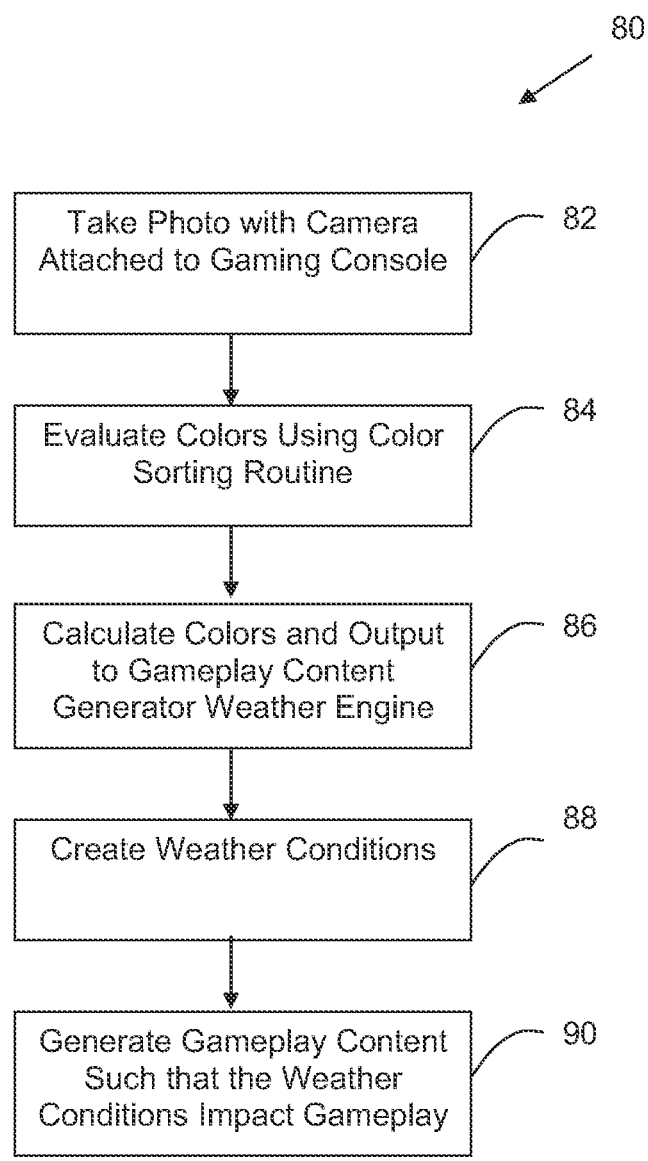
FIG. 9 is a flowchart illustrating a method to alter weather conditions in a virtual world based on an image color content.

In yet another example embodiment, images may be used to alter weather conditions in gameplay content. FIG. 9 is a flowchart illustrating a method 80 for altering weather conditions in a virtual world based on input obtained from an image. In method 80, a camera attached to the video gaming console may be used to capture an image, as indicated at block 82. In one example, at the start of a level, the camera may take a snapshot of the current surroundings. The photograph is sent to a color analyzing routine which determines the predominant colors of the photo, as indicated at block 84. The value of those colors is then sent to a weather routine of the gameplay content generator, as indicated at block 86, which is a software routine dedicated to generating in-game weather based upon the colors found within the picture. For example, if a picture were predominantly blue, the weather routine may create a rain-storm in the game, a predominantly white photo might create a snowstorm, and predominantly green images would cause a fog cloud to roll in. The weather conditions for the virtual world generated by the gaming system are then created by the gameplay content generator, as indicated at block 88. The generated weather patterns would then affect the gameplay, limiting movement speeds, causing slipperiness, and limiting visual distance in various ways, based upon the specific weather effect, as indicated at block 90.

In embodiments where a camera is used to obtain an image, lighting effects may significantly alter the processing and interpretation of the image. These lighting changes may result in different content being generated from one setting despite only the lighting being changed. For example, an image captured at midday and an image captured at night will, generally, result in different content being generated based on the respective images because of the changed lighting conditions.

Figure 10:
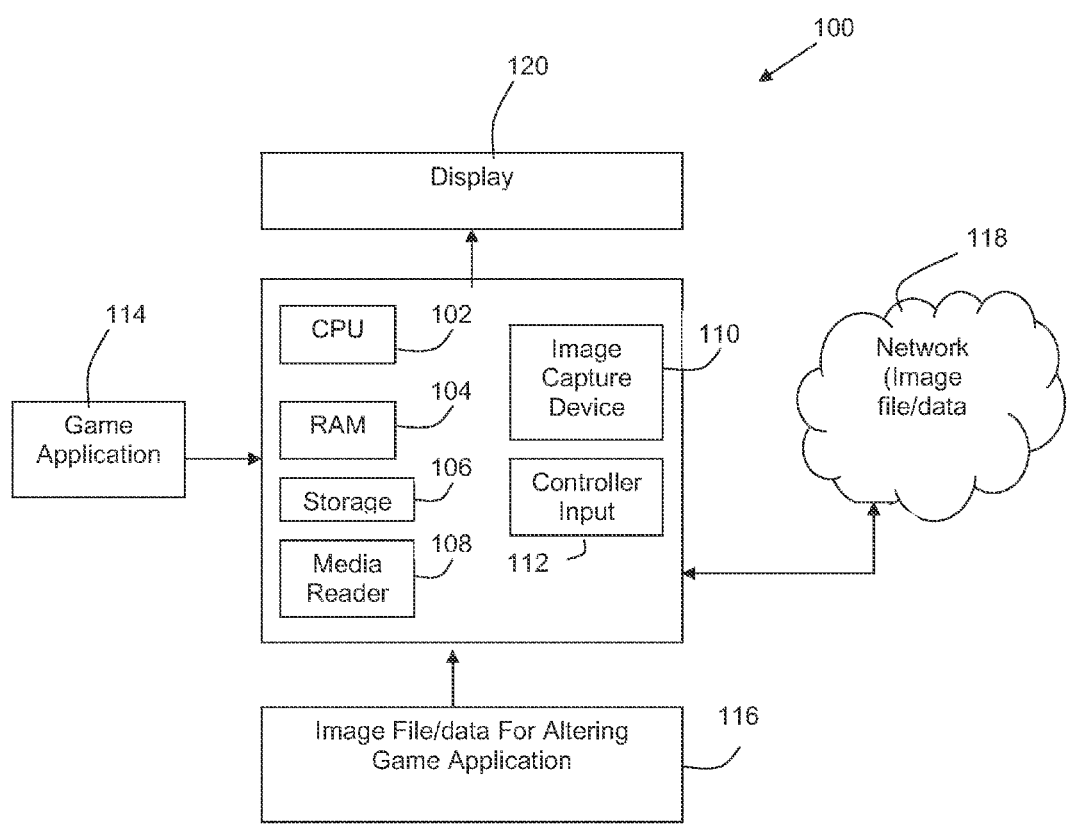
FIG. 10 illustrates a block diagram of an example video game system configured to alter an output based on an image.

FIG. 10 illustrates an example video gaming system 100. The video gaming system 100 includes a processor (CPU) 102, random access memory (RAM) 104, storage 106, a media reader 108, an image capture device 110, and a controller input 112. The CPU 102 may be an suitable processor capable of executing gaming software. In some embodiments, the CPU 102 may include more than one processor or processing cores and may have one or more processors dedicated to generating graphical output. The RAM 104 may include one or more different types of random access memory and may operate as execution memory. That is, the RAM 104 may store algorithms and data on a non-permanent basis for execution by the CPU 102. The storage 106 may include hard disk drives, solid state drives, etc., configured to store digital data. For example, the storage 106 may store an operating system for operation of the video gaming system 100 and games to be played on the system 100. The media reader 108 may include a CD/DVD drive, a Blu-ray™ disc player, a SD Card™ reader, etc., and may be used to read in data, such as image data and game data, for example, into the system 100. The image capture device 110 may include any digital imaging device including still cameras, video cameras, scanners, etc. and may be integrated into the body of the system 100 or external to the system and simply coupled to the system.

The controller input 112 may include any suitable input device including a remote controller, a keyboard, a number pad, a joystick, a steering wheel, a mouse, etc. and may be configured to provide one or more input types into the system 100. For example, the controller input 112 may provide accelerometer data and push button data to the system 100. Additionally, the controller input 112 may be configured to provide feedback to a user via haptic systems (not shown) such as vibration, for example.

The video gaming system 100 is configured to receive and execute a game application. The game application 114 may be read from the storage 106, from media by the media reader 108, from a network source, or any other available source for the game application. Upon execution of the gaming application, the video gaming system may generate content and receive user input to provide a fully interactive experience for a user.

The video game content provided to the user is altered by the input of image data 116. The image data may be read into the system from the storage 106, from media by the media reader 108, from a network source 118, such as the internet for example, or may be captured by the image capture device 110. The altered gameplay content is then provided to a user via a display 120. The display 120 may be integrated with the system 100 or separate from the system but communicatively coupled with the system 100.

The altering of the game application using data obtained from an image allows for continually changing gameplay content and a unique user experience. However, it should be understood that the foregoing example embodiments are merely presented as examples and are not intended to limit the scope of the disclosure. Indeed, while specific examples have been described with reference to certain embodiments, those of ordinary skill in the art should recognize that changes can be made to the example embodiments without departing from the spirit and the scope of the invention. For example, in some embodiments more than one image may be used to generate gameplay content. Indeed, multiple images may be used, including the obtaining of new images, during gameplay to affect the content presented to a user throughout a user's experience playing a particular game. Furthermore, it should be understood that elements of the embodiments may be combined with and/or used in lieu of elements of other embodiments to achieve a desired result. For example, a color scheme of an image may be used instead of, or in combination with, the edges of an image to generate an attack pattern and/or a weather pattern for gameplay. Specifically, the color scheme of an image may be used to determine the weather with which game characters will have to deal during a military campaign, for example. As such, the described embodiments are to be considered in all respects as illustrative and not restrictive.

Although the present disclosure has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the disclosure is defined by the appended claims. The various embodiments, operations, components and configurations disclosed herein are generally exemplary rather than limiting in scope.

What is claimed is:

1. A method of generating unique gameplay content for a video game virtual world comprising:
   obtaining a digital image from a network location, an image capture device, or a memory device coupled to a game system upon initiation of a video game;
   extracting data from the digital image, wherein extracting data comprises randomly selecting one or more pixels of the image;
   determining, by a gameplay engine, one or more characteristics of the image based on the extracted data;
   generating, by the gameplay engine, interactive gameplay content based on the one or more characteristics of the image; and
   transmitting the interactive gameplay content to a display device for display.

2. The method of claim 1, wherein determining one or more characteristics of the image comprises determining a red, a green and a blue value for each of the one or more randomly selected pixels; and wherein the red, green and blue values are used as seed values for a terrain generator in the gameplay engine.

3. The method of claim 2 wherein determining one or more characteristics of the image comprises determining if the image contains curved lines or straight lines and generating content reflective of whether the image contains curved lines or straight lines.

4. The method of claim 3 comprising:
   identifying a facial image in the obtained image;
   processing the facial image to determine one or more facial characteristics;
   correlating the one or more facial characteristics with one or more character attributes of a default character object; and
   modifying the default character object with the one or more character attributes based on the facial characteristics.

5. The method of claim 1 wherein extracting data from the image comprises obtaining color data for the image and wherein determining one or more characteristics of the data comprises determining a color content of the image, the color content of the image being a predominant color used in the image, the gameplay engine using the color content to modify an attribute of a weather object to coincide with a weather pattern associated with the color content, the weather attribute limiting or increasing a character object's movement, speed or limiting a character object's sight distance in the virtual world.

6. The method of claim 1, wherein extracting data from the digital image comprises determining one or more predominate colors in the digital image.

7. The method of claim 6, wherein generating interactive game content based on the one or more characteristics of the image comprises generating a weather routine based on the one or more predominate colors.

8. The method of claim 7, wherein the weather routine affects one or more characteristics of the interactive game content.

9. The method of claim 8, wherein the one or more characteristics of the interactive game content include visibility or movement speeds for one or more characters within the video game.

10. The method of claim 3, further comprising:
    identifying a facial image in the obtained image;
    processing the facial image to determine one or more facial characteristics;
    comparing the one or more facial characteristics with one or more average characteristics correlating to the same features as the one or more facial characteristics; and
    when the one or more facial characteristics exceeds a threshold of the one or more average characteristics, modifying an associated characteristic in the default character object to correlate to the one or more facial characteristics.

11. A method of generating unique gameplay content for a video game virtual world comprising:
    obtaining a digital image from a network location, an image capture device, or a memory device coupled to a game system upon initiation of a video game;
    extracting data from the digital image;
    determining, by a gameplay engine, one or more characteristics of the image based on the extracted data;
    determining, by the gameplay engine, edges of features contained within the obtained image;
    generating gameplay content based on the edges, the edge information being used by the gameplay engine to determine an attack pattern and number of troops for an enemy in the video game virtual world; and
    transmitting the generated gameplay content to a display device for display.

12. The method of claim 11, wherein determining edges of features contained within the obtained image comprises:
    comparing a first value of a first pixel with a second value of a second pixel, wherein the second pixel is adjacent to the first pixel; and
    determining if the difference between the first value and the second value exceeds a predetermined threshold.

13. A system for generating gameplay content for a video game, comprising:
    at least one processing element; and
    a computer readable storage device having program instructions stored thereon for execution by the at least one processing element, the program instructions comprising operations for:
    extracting data from a digital image obtained from one of a network location, an image capture device, or a memory device coupled to video game, wherein extracting data comprises randomly selecting one or more pixels of the image;

analyzing, by a gameplay engine, the extracted data to determine one or more image characteristics of the image;

generating interactive content for the video game based on the image characteristics; and transmitting the interactive content to a display device for display.

14. The system of claim 13, wherein generating interactive content comprises altering one or more features of the video game based on the image characteristics, wherein the image characteristics include one or more geometric features of the image.

15. The system of claim 13, wherein analyzing the image to determine one or more image characteristics comprises determining if the image contains curved lines or straight lines.

16. The system of claim 15, wherein generating interactive content for the video game based on the image characteristics comprises generating content reflective of whether the image contains curved lines or straight lines.

17. The system of claim 13, wherein analyzing the image to determine one or more image characteristics comprises determining edges of features contained within the image.

18. The system of claim 13, wherein generating the interactive content for the video game comprises:

providing the one or more image characteristics to a terrain generator; and creating by the terrain generator a terrain for the video game using the one or more image characteristics.

19. The system of claim 18, wherein the one or more image characteristics include pixel data from a plurality of pixels within the image.

20. A system for generating gameplay content for a video game, comprising:

at least one processing element; and a computer readable storage device having program instructions stored thereon for execution by the at least one processing element, the program instructions comprising operations for:

extracting data from a digital image obtained from one of a network location, an image capture device, or a memory device coupled to video game, wherein extracting data comprises randomly selecting one or more pixels of the image;

analyzing, by a gameplay engine, the extracted data to determine one or more image characteristics of the image; and generating interactive content for the video game based on the image characteristics, wherein generating the interactive content for the video game comprises generating content based on the edges of features within the image, the edge information being used by a gameplay engine to determine an attack pattern and number of troops for an enemy in the video game virtual world.

* * * * *